(12) United States Patent
Yoshino et al.

(10) Patent No.: US 7,108,241 B2
(45) Date of Patent: Sep. 19, 2006

(54) FLOW CONTROL VALVE

(75) Inventors: Kenro Yoshino, Nobeoka (JP); Shunichiro Hagihara, Nobeoka (JP)

(73) Assignee: Asahi Organic Chemicals Industry Co., Ltd., Nobeoka (JP)

( * ) Notice: Subject to any disclaimer, the term of this patent is extended or adjusted under 35 U.S.C. 154(b) by 0 days.

(21) Appl. No.: 10/519,706

(22) PCT Filed: Jul. 3, 2003

(86) PCT No.: PCT/JP03/08503

§ 371 (c)(1),
(2), (4) Date: Jul. 28, 2005

(87) PCT Pub. No.: WO2004/006035

PCT Pub. Date: Jan. 15, 2004

(65) Prior Publication Data

US 2005/0285064 A1   Dec. 29, 2005

(30) Foreign Application Priority Data

Jul. 3, 2002   (JP)   ............................. 2002-194953

(51) Int. Cl.
*F16K 31/145*   (2006.01)
(52) U.S. Cl. .................. 251/61.5; 251/61.2; 251/335.2
(58) Field of Classification Search ............... 251/61.5, 251/61.2, 335.2
See application file for complete search history.

(56) References Cited

U.S. PATENT DOCUMENTS 2,831,494 A   4/1958   Taplin 3,215,159 A * 11/1965 Nixon ....................... 251/61.5
3,366,315 A   1/1968 Alberani
5,983,926 A * 11/1999 Mastuzawa ................. 137/500
6,386,509 B1   5/2002 Mastuzawa et al.

FOREIGN PATENT DOCUMENTS

| DE | 619 988 C | 10/1935 |
|---|---|---|
| EP | 0 892 204 A | 1/1999 |
| JP | 4-315206 | 11/1992 |
| JP | 06-295209 | 10/1994 |
| JP | 7-253817 | 10/1995 |
| JP | 11-85287 | 3/1999 |
| JP | 2000-193106 | 7/2000 |
| JP | 2001-099344 | 4/2001 |
| JP | 2002-139161 | 5/2002 |
| JP | 2003-84841 | 3/2003 |
| JP | 2003-248517 | 9/2003 |

OTHER PUBLICATIONS

*PCT/ISA/210 International Search Report.

* cited by examiner

*Primary Examiner*—Edward K. Look
*Assistant Examiner*—Andrew J. Rost
(74) *Attorney, Agent, or Firm*—Buchanan Ingersoll PC (57) ABSTRACT

A flow control valve includes a main body 1, bonnet 2, spring receiving portion 3, piston 4, spring 24, first diaphragm 27, first valve member 5, second valve member 6 and base plate 7, wherein an opening area of a hydraulic control portion composed of a valve element of the second valve member and a valve seat of the main body is changed according to a motion of the piston.

2 Claims, 5 Drawing Sheets

FLOW CONTROL VALVE

FIELD OF THE INVENTION

The present invention relates to a flow control valve used for a fluid transport pipe in which it is necessary to adjust a flow rate of the fluid transported in the pipe. More particularly, the present invention relates to a flow control valve, which is preferably used for an ultra demineralized water pipe line or various chemicals pipe lines in the semiconductor industry, capable of quickly responding to a change in the hydraulic pressure.

BACKGROUND ART

JP-A-6-295209 discloses a flow control valve.

Figure 5:
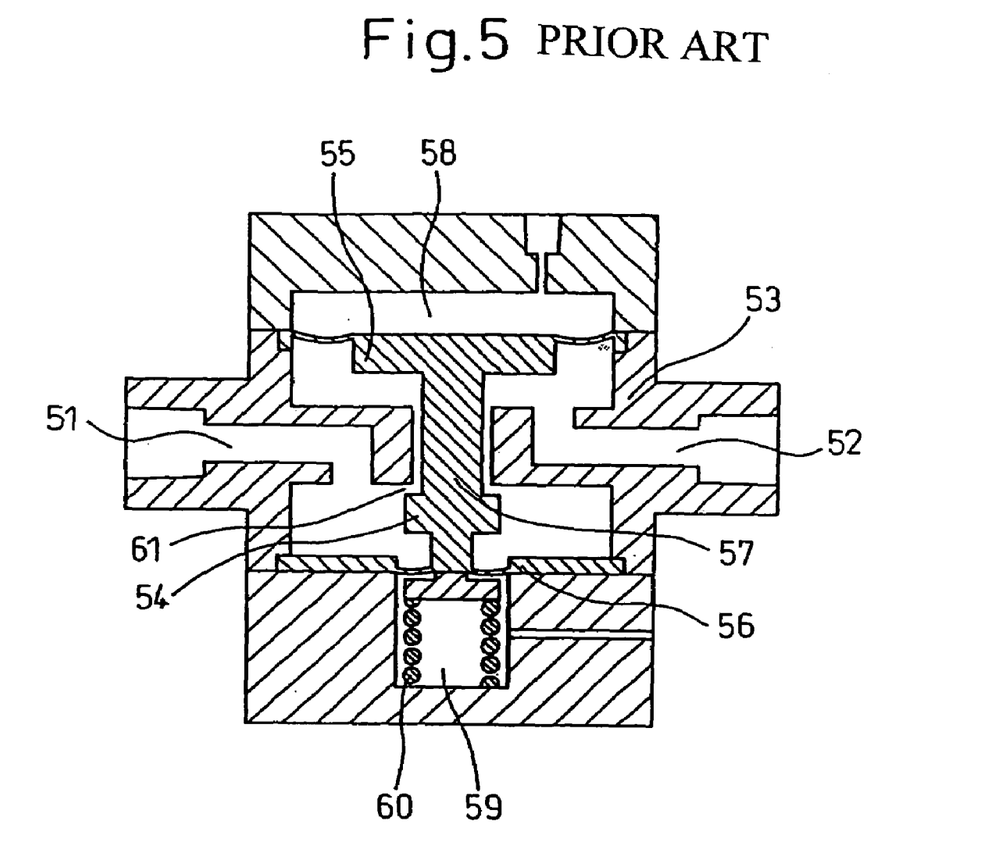
FIG. 5 is a longitudinal sectional view showing a conventional flow control valve.

Referring to FIG. 5, the flow control valve disclosed in JP-A-6-295209 includes: a main body 53 having an inlet passage 51 and outlet passage 52; a valve portion 54; and a valve element 57 having a first diaphragm portion 55 and second diaphragm portion 56. By the first diaphragm portion 55 and second diaphragm portion 56, the chamber of the main body 53 is divided into a first pressure chamber 58 and a second pressure chamber 59. Constant pressure directed inward is given at all times from the outside of the first pressure chamber 59 by utilizing compressed air. Further, constant pressure directed inward is given at all times by the spring 60 provided inside the second pressure chamber 59. The pressure receiving area of the first diaphragm portion 55 is larger than the pressure receiving area of the second diaphragm portion 56.

However, the valve device, in which the above diaphragms are used, is disadvantageous in that gas is transmitted through the diaphragms. Especially, in the case of a pipe line in which chemicals are used, corrosive gas is generated, by the chemicals, in some cases. It is well known that the thus generated corrosive gas is transmitted through the diaphragms and metallic parts arranged close to the diaphragms are corroded.

In the case of the flow control valve disclosed in the above official gazette, the spring 60 is arranged on a lower face of the second diaphragm portion 56. Therefore, in order to protect the spring 60 from the corrosive gas which has been transmitted through the second diaphragm portion 56, it is necessary to conduct coating on the spring 60 with PTFE and others. However, when coating is conducted on the spring 60, the spring constant of the spring 60 is changed by the coating thickness, which could be one of the reasons by which a difference is caused between the individual flow control valves.

In general, in the flow control valve, it is well known that control can be precisely conducted and the control performance can be enhanced when a change in the degree of opening of the valve is small with respect to a traveling distance of the valve element. In the case of the flow control valve disclosed in the above official gazette, when a change in the opening area of the hydraulic control passage is small with respect to a traveling distance of the valve element 57 in the axial direction, the flow control performance is enhanced. In order to reduce the change in the opening area with respect to the traveling distance of the valve element 57, it is necessary to design a valve portion 54 the diameter of which is small. Accordingly, it is necessary to design a rod, the diameter of which is small, for connecting the valve portion 54 with the first diaphragm portion 55. Further, it is necessary to design a rod, the diameter of which is small, for connecting the valve portion 54 with the second diaphragm portion 56.

In the flow control valve disclosed in the above official gazette, when the position of the valve 54 is adjusted by the pressure in the first pressure chamber 58, the opening area of the flow rate control passage 61 can be adjusted. On the other hand, whether or not the diaphragm portion is liable to be deformed depends upon the diameter of the diaphragm portion. Accordingly, the larger the diameter of the diaphragm is, the more linearly the pressure in the first pressure chamber 58 is changed with respect to the displacement of the valve portion 54 and the lower the hysteresis becomes. On the other hand, when the diameters of the first diaphragm portion 55 and the second diaphragm portion 56 are decreased, it becomes difficult for these diaphragm portions to be deformed, and the change in the pressure in the first pressure chamber 58 with respect to the displacement of the valve portion 54 becomes non-linear, and the hysteresis is increased.

That is, in order to enhance the hydraulic control performance of the flow control valve, it is preferable that the diameter of the valve portion 54 is decreased and the diameter of the diaphragm portion is increased.

In this case, when the diameter of the first diaphragm portion 55 is increased and the diameter of the valve portion 54 is decreased, the intensity of the force, which is caused by the pressure in the first pressure chamber 58 and pushes the first diaphragm portion 55 downward, is increased, and the intensity of the force, which is caused by the pressure of the downstream side fluid and pushes the first diaphragm portion 55 upward, is also increased. Therefore, in order to keep the balance of the force, the intensity of the upward force generated by a repulsive force of the spring must be increased.

At this time, these forces are received by a rod for connecting the upper and lower end faces of the valve portion 54 with the first diaphragm portion 55 and the second diaphragm portion 56. This rod is compressed in the axial direction at all times. Therefore, it is necessary to give attention to the mechanical strength of the rod. Especially when the hydraulic fluid is a corrosive fluid of high temperature, the rod is usually made of PTFE, the chemicals-resistance-property of which is high. However, PTFE is characterized in that the mechanical strength is low and, further, PTFE creeps easily. Accordingly, when the rod made of PTFE is used over a long period of time, it is deformed or buckled, and the hydraulic control performance of the flow control valve is deteriorated.

DISCLOSURE OF THE INVENTION

The present invention has been accomplished to solve the above problems of the prior art. It is an object of the present invention to provide a flow control valve characterized in that: it can be manufactured at a low manufacturing cost with a high yield; impurities are seldom dissolved out from the valve into the fluid so that the chemicals are seldom polluted; and the durability is high and the control performance is stable.

According to the present invention, a flow control valve includes: a main body, bonnet, spring receiving portion, piston, spring, first diaphragm, first valve member, second valve member, and base plate.

The main body includes: a second cavity provided at the central lower portion, being opened to the bottom portion; an inlet passage communicated with the second cavity; a first cavity, the diameter of which is larger than that of the second cavity, the upper face of which is open to the upper portion; an outlet passage communicated with the first cavity; and a communicating hole, the diameter of which is smaller than that of the first cavity, for communicating the first cavity with the second cavity, wherein an upper face of the second cavity composes a valve seat.

A bonnet includes: a cylindrical cavity communicated with an air supply hole and air discharge hole; and a step portion provided on a lower end inner circumferential face.

A spring receiving portion is inserted into the step portion of the bonnet, and a through-hole is formed in the central portion.

A piston includes: a first joining portion, the diameter of which is smaller than that of the through-hole of the spring receiving portion, arranged in the lower end portion; and a flange portion arranged in the upper portion, wherein the piston is inserted into the cavity of the bonnet being capable of moving upward and downward.

A spring is interposed and supported between a lower end face of the flange portion of the piston and an upper end face of the spring receiving portion.

A peripheral edge portion of the first diaphragm is held and fixed between the main body and the spring receiving portion. The first diaphragm covers the first cavity of the main body, and a central portion of the first diaphragm composing the first valve chamber is thick.

A first valve member includes: a second joining portion arranged in an upper face central portion, the second joining portion being joined and fixed to the first joining portion of the piston through the through-hole of the spring receiving portion; and a third joining portion arranged coaxially with the communicating hole of the main body at the lower face center.

The second valve member is located in the second cavity of the main body. The second valve member includes: a valve element, the diameter of which is larger than that of the communicating hole of the main body; a fourth joining portion joined and fixed to the third joining portion of the first valve member, provided being protruded onto the valve element upper end face; a rod protruded from the valve element lower end face; and a second diaphragm extended from the rod lower end face in radial direction.

The base plate is located in a lower portion of the main body. The base plate includes a protruding portion, which holds and fixes a peripheral edge portion of the second diaphragm of the second valve member between the protruding portion and the main body, arranged at the upper center. A recess portion is provided in an upper end portion of the protruding portion of the base plate, and a breathing hole communicated with the recess portion is provided in the base plate.

According to the motion of the piston, an opening area of the hydraulic control portion composed of the valve element of the second valve member and the valve seat of the main body is changed.

The main body, the first valve member and the second valve member are preferably made of polytetrafluoroethylene.

In this connection, the main body is preferably made of fluorine resin such as PTFE or PFA. However, the main body may be made of a plastic such as polyvinyl chloride or polypropylene. Alternatively, the main body may be made of metal. That is, the material of the main body is not particularly limited to the specific material. From the viewpoint of ensuring the mechanical strength and the heat resistance property, the bonnet, the spring receiving portion and the piston are preferably made of polypropylene. However, in the same manner as that described above, the bonnet, the spring receiving portion and the piston may be made of other plastics or metal. That is, the material of the bonnet, the spring receiving portion and the piston is not particularly limited to the specific material. From the viewpoint of ensuring the corrosion resistance property and the rust proof property, the spring is preferably made of stainless steel. However, the spring may be made of other metals. That is, the material of the spring is not particularly limited to the specific material. Further, each diaphragm is preferably made of fluororesin such as PTFE. However, each diaphragm may be made of rubber or metal. That is, the material of each diaphragm is not particularly limited to the specific material.

MOST PREFERRED EMBODIMENT

Referring to the accompanying drawings, an embodiment of the present invention will be explained below. Of course, the present invention is not limited to the specific embodiment.

Figure 1:
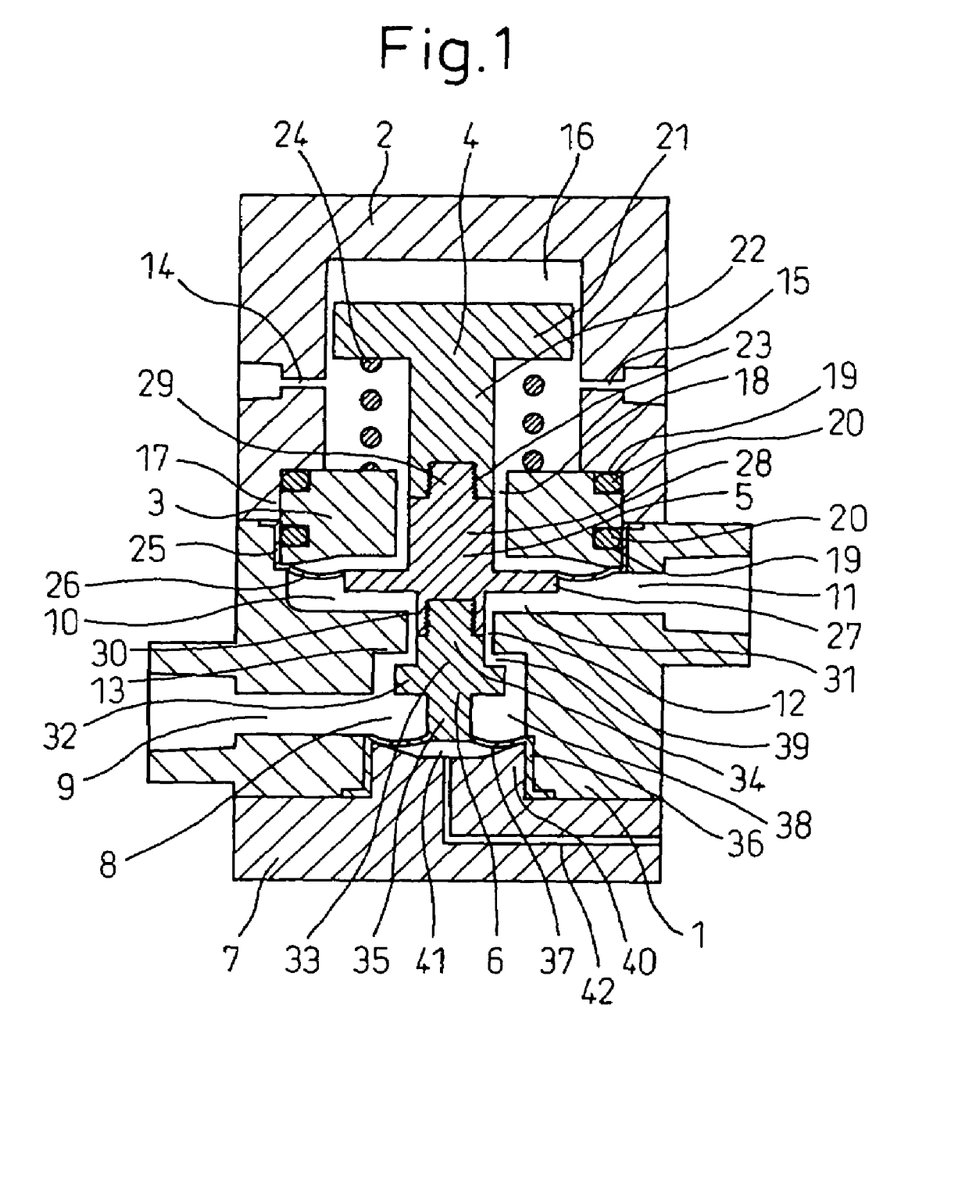
FIG. 1 is a longitudinal sectional view of the flow control valve of the present invention.

In the drawing, the main body 1 made of PTFE includes: a second cavity 8 which is provided being open to the bottom portion of the lower center; and a first cavity 10, the diameter of which is larger than that of the second cavity 8, the upper face of which is open to the upper portion. The main body 1 includes: an inlet passage 9 communicated with the second cavity 8, formed on the side of the main body 1; an outlet passage 11 communicated with the first cavity 10, formed on the face opposed to the inlet passage 9; and a communicating hole 12, the diameter of which is smaller than that of the first cavity 10, through which the first cavity 10 and the second cavity 8 communicate with each other. The valve seat 13 is formed on an upper face portion of the second cavity 8.

The bonnet 2 made of PP includes: a cylindrical cavity 16 provided inside the bonnet 2; and a step portion 17, the diameter of which is expanded larger than that of the cavity 16, which is provided on an inner circumferential face of the lower end. The side of the bonnet 2 include: a gas supply hole 14 for communicating the cavity 16 with the outside so that compressed inert gas or air can be supplied into the inside of the cavity 16; and a gas discharge hole 15 from which a small quantity of gas or air introduced from the gas supply hole 14 can be discharged.

The spring receiving portion 3 made of PP, the shape of which is flat and circular, has a through-hole 18 at the center, and a substantially upper half portion of the spring receiving portion 3 is inserted into the step portion 17 of the bonnet 2. On the side of the spring receiving portion 3, the annular groove or the annular cutout portion 19 is provided. When O-ring 20 is attached into the annular cutout portion 19, inert gas or air can be prevented from flowing outside from the bonnet 2.

The piston 4 made of PP includes: a disk-shaped flange portion 21 provided in the upper portion; a columnar piston shaft 22 protruding from the central lower portion of the flange portion 21; and a first joining portion 23 composed of a female screw portion provided at the lower end of the piston shaft 22. The diameter of the piston shaft 22 is smaller than that of the through-hole 18 of the spring receiving portion 3. The first joining portion 23 is joined to the second joining portion 29 of the first valve member 5 described later by means of screwing.

The spring 24 made of stainless steel SUS is held being interposed between the lower end face of the flange portion 21 of the piston 4 and the upper end face of the spring receiving portion 3. The spring 24 is expanded and contracted according to the upward and downward motion of the piston 4. It is preferable that the free length of the spring 24 is large so that a change in the load at the time of expansion and contraction of the spring 24 can be small.

Figure 3:
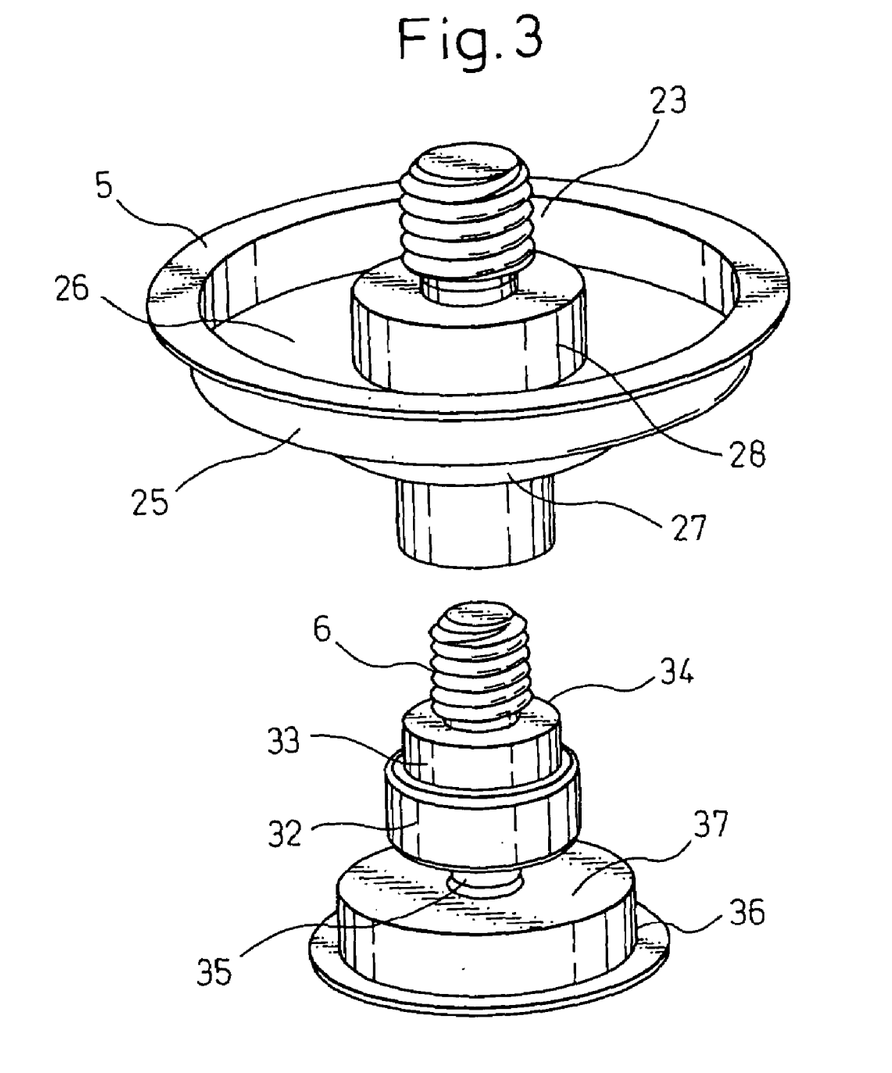
FIG. 3 is a perspective view showing a first valve member and second valve member of the flow control valve of FIG. 1.
Figure 4:
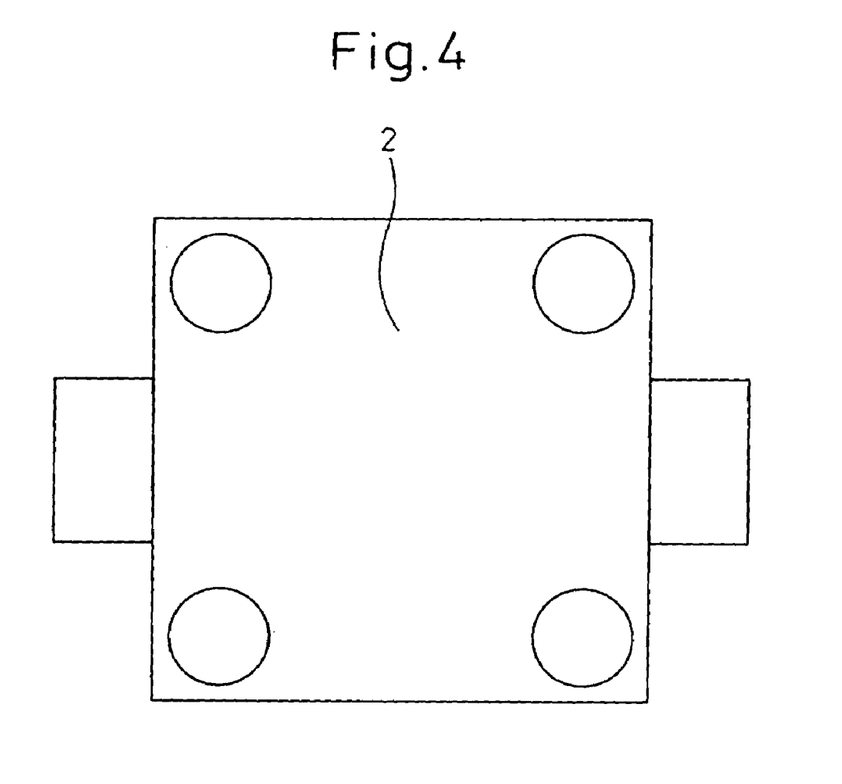
FIG. 4 is a plan view showing a flow control valve of the present invention.

The first valve member 5 made of PTFE includes: a film portion 26 having a cylindrical portion 25 protruding upward from the outer circumferential edge portion; a first diaphragm 27, at the central portion of which a thick portion is formed; a shaft portion 28 provided being protruded from the central upper face of the first diaphragm 27; a second joining portion 29 composed of a small diameter male screw, provided in the upper end portion of the shaft portion 28; and a third joining portion 30 provided being protruded from the central lower face of the shaft portion 28, composed of a female screw portion formed at the lower end portion (shown in FIG. 3). The third joining portion 30 is screwed to the joining portion 34 of the second valve member 6. When the cylindrical portion 25 of the first diaphragm 27 is interposed and fixed between the main body 1 and the spring receiving portion 3, the lower face of the first diaphragm 27 tightly closes the first valve chamber 31 so that the first valve chamber 31 can be formed in the first cavity 10.

The cavity 16, which is formed being surrounded by the upper face of the first diaphragm 27, the spring receiving portion 3 and the bonnet 2, is tightly closed via O-ring 20. Therefore, the cavity 16 composes a gas chamber filled with compressed inert gas or air supplied from the gas supply hole 14 of the bonnet 2.

The second valve member 6 made of PTFE includes: a valve element 32, the diameter of which is larger than that of the communicating hole 12, arranged inside the second cavity 8 of the main body 1; a shaft portion 33 protruding from the upper end face of the valve element 32; a fourth joining portion 34 composed of the male screw portion joined and fixed by being screwed to the third joining portion 30 of the first valve member 5 provided at the upper end above the shaft portion 33; a rod 35 protruding downward from the lower end face of the valve element 32; and a second diaphragm 37 having a cylindrical protruding portion 36 provided being protruded downward from the peripheral edge portion extending in the radial direction from the lower end face of the rod 35 (shown in FIG. 3). When the cylindrical protruding portion 36 of the second diaphragm 37 is interposed between the protruding portion 40 of the base plate 7 and the main body 1, the second diaphragm 37 tightly closes the second cavity 8 of the main body 1 so that the second valve chamber 38 can be formed.

The base plate 7 made of PP includes a protruding portion 40, which is arranged at the upper central portion, for fixing the cylindrical protruding portion 36 of the second diaphragm 37 of the second valve member 6 so that the cylindrical protruding portion 36 can be interposed between the protruding portion 40 and the main body 1. At the upper end portion of the protruding portion 40, the recess portion 41 is provided. On the side of the base plate 7, the breathing hole 42 communicated with the recess portion 41 is open. The main body 1 is interposed between the base plate 7 and the bonnet 2 by through-bolts and nuts (not shown).

In this embodiment, each joining portion is joined by means of a screw. However, each joining portion is not necessarily joined by means of a screw. Each joining portion may be joined by means of adhesion. As shown in FIG. 3, the appearance of the flow control valve of the present invention is formed into a circular shape in the plan view. However, the appearance of the flow control valve of the present invention is not limited to the above specific embodiment. According to the use of the flow control valve, the appearance of the flow control valve of the present invention may be formed into a circular shape in the plan view.

Operation of the present embodiment will be explained as follows.

FIG. 1 is a view showing a case in which compressed air of predetermined pressure is supplied to the cavity 16 of the bonnet 2. At this time, the valve element 32 of the second valve member 6 is pushed upward by a repulsive force of the spring 24, which is interposed between the flange portion 21 of the piston 4 and the spring receiving portion 3, and by the hydraulic pressure given to the lower face of the first diaphragm 27 of the first valve member 5. The valve element 32 of the second valve member 6 is pushed downward by the pressure of compressed air given onto the upper face of the first diaphragm 27. In more detail, both the lower face of the valve element 32 and the upper face of the second diaphragm 37 of the second valve member 6 receive hydraulic pressure. However, both the pressure receiving areas are approximately equal to each other. Therefore, forces given to both the faces are canceled to each other. Accordingly, the valve element 32 of the second valve member 6 comes to a standstill at a position where the above three forces are balanced to each other. Therefore, unless the pressure on the upstream side and the downstream side of the control valve is changed, it is possible to maintain a constant flow rate.

Figure 2:
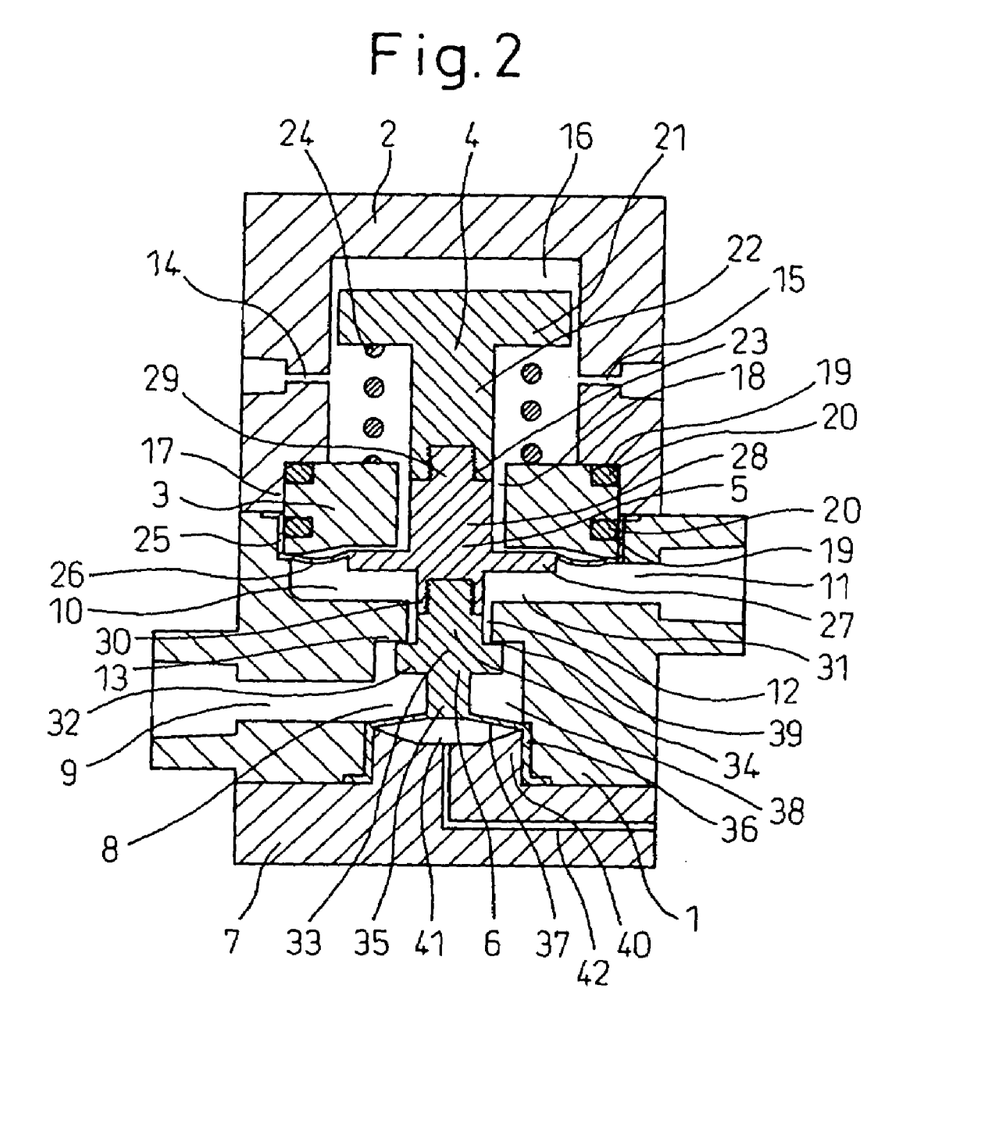
FIG. 2 is a longitudinal sectional view showing a state in which the upstream side pressure is increased in FIG. 1.

When the hydraulic pressure on the upstream side is increased, the pressure in the first valve chamber 31 is instantaneously increased. Due to the foregoing, an intensity of the force given to the lower face of the first diaphragm 27 from the fluid is stronger than an intensity of the force given to the upper face of the first diaphragm 27 from the compressed air. Accordingly, the diaphragm is moved upward. Therefore, the valve element 32 is moved upward, and an opening area of the hydraulic control portion 39, which is formed between the valve element 32 and the valve seat 13, is decreased and the pressure in the first valve chamber 31 is reduced. Finally, the valve element 32 is moved to a position where the above three forces are balanced to each other and comes to a standstill as shown in FIG. 2. At this time, unless a load of the spring 24 is greatly changed, the pressure in the cavity 16 is not changed either, that is, an intensity of the force given to the upper face of the first diaphragm 27 is not changed either. Therefore, the pressure given to the lower face of the first diaphragm 27 is not substantially changed. Accordingly, the hydraulic pressure on the lower face of the first diaphragm 27, that is, the pressure in the first valve chamber 31 is maintained at the substantially same pressure as the previous pressure that is given before the pressure on the upstream side is increased.

When the hydraulic pressure on the upstream side in the state shown in FIG. 2 is decreased, the pressure in the first valve chamber 31 is instantaneously decreased. Due to the foregoing, an intensity of the force given to the lower face of the first diaphragm 27 from the fluid becomes lower than an intensity of the force given to the upper face of the first diaphragm 27 from the compressed air, and the diaphragm is moved downward. Accordingly, the valve element 32 is moved downward, and an opening area of the hydraulic control section 39 formed between the valve element 32 and the valve seat 13 is increased and the hydraulic pressure in the first valve chamber 31 is increased. Finally, the valve element 32 comes to a standstill at a position where the above three forces are balanced to each other in the state shown in FIG. 1. Accordingly, in the same manner as that of the case in which the pressure on the upstream side is increased, the hydraulic pressure in the first valve chamber 31 becomes substantially the same as the previous pressure.

As explained above, even when the hydraulic pressure on the upstream side of the flow control valve is changed, the hydraulic pressure in the first valve chamber 31 is hardly changed. Therefore, unless a change in the pressure loss in the pipe, which is arranged after the flow control valve, is caused, it is possible to maintain the flow rate constant.

The hydraulic pressure in the first valve chamber 31 can be adjusted by the compressed air pressure in the cavity 16. Therefore, the flow rate can be also adjusted by the compressed air pressure.

Further, unless the compressed air is supplied into the cavity 16 of the bonnet 2, the piston 4 can be pushed up by the action of the spring 24. The first valve member 5 and the second valve member 6, which are joined to the piston 4, are also pulled up by the piston 4. Accordingly, the valve element 32 of the second valve member 6 and the valve seat 13 of the main body 1 are closely contacted with each other so that a flow of the fluid can be blocked.

Since the compressed air in the cavity 16 of the bonnet 2 is supplied from the air supply hole 14 and discharged from the discharge hole 15 at all times, even when gas generated from the hydraulic fluid is transmitted through the first diaphragm 27, the transmitted gas is discharged together with a current of air flowing from the air supply hole 14 to the discharge hole 15. Therefore, the gas generated from the hydraulic fluid can be prevented from staying in the cavity 16. Accordingly, corrosion of the spring 24 can be prevented. Therefore, it is unnecessary to conduct coating on the spring for the prevention of corrosion, and the manufacturing cost of the spring can be reduced. In addition to that, no change is caused in the spring constant. Therefore, a difference in the individual springs can be reduced and the yield of manufacturing the springs can be enhanced.

The upward force caused by the hydraulic pressure in the first valve chamber 31, the downward force of the first diaphragm 27 caused by the pressure in the cavity 16 and the upward force caused by the repulsive force of the spring 24 are canceled by being supported by the shaft 28 of the first valve member 5 and the piston shaft 22 of the piston 4. Therefore, even when the diameter of the valve element 32 is reduced, there is no possibility that the rod 35 and the fourth joining portion 34 are deformed. Accordingly, the durability of the flow control valve can be enhanced.

According to the present invention, the flow control valve is composed as explained above. When the thus composed flow control valve is put into practical use, the following excellent advantages can be provided.

(1) As the compressed air is discharged outside from the cavity at all times, the spring is not corroded by the corrosive gas which has been transmitted through the diaphragm. Accordingly, no coating is necessary on the spring. Therefore, the manufacturing cost of the flow control valve can be reduced.

(2) As it is unnecessary to conduct coating on the spring, it is possible to reduce a difference between the individual springs. Therefore, the yield of manufacturing the springs can be enhanced.

(3) As the rod and the fourth joining portion are not deformed and buckled, the durability can be enhanced.

(4) Members coming into contact with the fluid can be made of material having a high chemical resistance. Therefore, impurities are seldom dissolved out and further the pollution is seldom caused by chemicals.

(5) The flow control valve of the invention is compact and capable of conducting stable hydraulic pressure control.

The invention claimed is:

1. A flow control valve comprising:
a main body including a second cavity provided in a lower central portion of the main body being open to a bottom portion, also including an inlet passage communicated with the second cavity, also including a first cavity, the diameter of which is larger than that of the second cavity, an upper face of the first cavity being open to an upper portion, also including an outlet passage communicated with the first cavity, and also including a communicated hole, the diameter of which is smaller than that of the first cavity, the communicated hole communicating the first cavity with the second cavity, an upper face of the second cavity composing a valve seat;
a bonnet including a cylindrical cavity communicated with a gas supply hole and a gas discharge hole and also including a step portion arranged on a lower end circumferential face;
a spring receiving portion inserted into the step portion of the bonnet, having a through-hole at the center;
a piston including a first joining portion, the diameter of which is smaller than that of the through-hole of the spring receiving portion, provided at a lower end portion, and also including a flange portion provided in the upper portion, the piston being inserted into the cavity of the bonnet so that the piston can be moved upward and downward;
a spring interposed between a lower end face of the flange portion of the piston and an upper end face of the spring receiving portion;
a first diaphragm, the peripheral portion of which is interposed and fixed between the main body and the spring receiving portion, the first diaphragm covering the first cavity of the main body, a central portion of the first diaphragm, which forms a first valve chamber, being formed thick;
a first valve member including a second joining portion arranged in an upper face central portion, the second joining portion being joined and fixed to the first joining portion of the piston through the through-hole of the spring receiving portion, and also including a third joining portion arranged in a lower face central portion coaxially with the communicated hole of the main body;
a second valve member including a valve element, the diameter of which is larger than that of the communicated hole of the main body, located inside the second cavity of the main body, also including a fourth joining portion protruding from an upper end face of the valve element, joined and fixed to a third joining portion of the first valve member, also including a rod protruding from a lower end face of the valve element, and also including a second diaphragm extending from a lower end face of the rod in the radial direction; and a base plate located at a lower position of the main body including a protruding portion arranged at an upper central portion of the base plate, a peripheral edge portion of the second diaphragm of the second valve member being interposed and fixed between the main body and the protruding portion, a recess portion being provided in an upper end portion of the protruding portion, and also including a breathing hole communicated with the recess portion, wherein an opening area of the hydraulic control portion composed of the valve element of the second valve member and the valve seat of the main body is changed according to an upward and downward motion of the piston.

2. A flow control valve according to claim 1, wherein the main body, the first valve member and the second valve member are made of polytetrafluoroethylene.

* * * * *